(12) United States Patent
Han (10) Patent No.: US 12,034,899 B2
(45) Date of Patent: Jul. 9, 2024

(54) IMAGE FORMING APPARATUS, INFORMATION PROCESSING METHOD, AND RECORDING MEDIUM

(71) Applicant: Xiaofeng Han, Kanagawa (JP)

(72) Inventor: Xiaofeng Han, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 17/650,268

(22) Filed: Feb. 8, 2022

(65) Prior Publication Data

US 2022/0263976 A1   Aug. 18, 2022

(30) Foreign Application Priority Data

Feb. 12, 2021   (JP) .................................. 2021-020846

(51) Int. Cl.
  *H04N 1/44* (2006.01)
  *G06F 21/00* (2013.01)
  *G06F 21/45* (2013.01)

(52) U.S. Cl.
  CPC ........... *H04N 1/4433* (2013.01); *G06F 21/45* (2013.01)

(58) Field of Classification Search
  CPC .......... G06F 21/45; G06F 21/44; G06F 21/30; G06F 21/31; G06F 21/34; G06F 21/604; G06F 21/608
  See application file for complete search history.

(56) References Cited

U.S. PATENT DOCUMENTS

| | | | |
|---|---|---|---|
| 2011/0228311 A1 | 9/2011 | Oguma et al. | |
| 2014/0168687 A1* | 6/2014 | Kim ...................... | G06F 3/1238 358/1.14 |
| 2015/0062612 A1* | 3/2015 | Nishii .................. | H04N 1/4433 358/1.14 |
| 2021/0092241 A1 | 3/2021 | Yoshida et al. | |
| 2021/0099599 A1 | 4/2021 | Han et al. | |

FOREIGN PATENT DOCUMENTS

| | | |
|---|---|---|
| JP | 2004-287492 | 10/2004 |
| JP | 5069820 | 11/2012 |
| JP | 2018-069546 | 5/2018 |
| JP | 2019-087281 | 6/2019 |

OTHER PUBLICATIONS

Office Action dated Apr. 23, 2024 issued with respect to the basic Japanese Patent Application No. 2021-020846.

* cited by examiner

*Primary Examiner* — Edward Zee
(74) *Attorney, Agent, or Firm* — IPUSA, PLLC (57) ABSTRACT

An image forming apparatus includes circuitry; and a memory storing computer-executable instructions that cause the circuitry to execute determining an authentication method that is available for use for login, based on both a setting of the authentication method for login that is acquired via a network and the setting of the authentication method for login that is set in the image forming apparatus; and displaying, on the image forming apparatus, a login screen corresponding to the authentication method that is available for use.

8 Claims, 12 Drawing Sheets

Family name*

| kan |

PIN Code

| Set |

Reply Email Language

| Japanese ▽ |

Role

System Admin    ○ User

Device Account Link Settings

| Multifunction Printers/Copiers                           ∧ |

Device Account

| kan |

IC Card

| 123456 |

Set user permissions
The user permissions for scan and print functions are set in a different tab.    ( Open )

FIG.12

IMAGE FORMING APPARATUS, INFORMATION PROCESSING METHOD, AND RECORDING MEDIUM

CROSS-REFERENCE TO RELATED APPLICATION

The present application is based on and claims priority under 35 U.S.C. § 119 to Japanese Patent Application No. 2021-020846, filed on Feb. 12, 2021, the contents of which are incorporated herein by reference in their entirety.

BACKGROUND OF THE INVENTION

1. Field of the Invention

The present invention relates to an image forming apparatus, an information processing method, and a recording medium.

2. Description of the Related Art

Various services can be flexibly provided by managing accounts of users on the cloud side, and making settings for each of the users in an electronic device (for example, a multifunction peripheral (MFP)) connected to the network. Examples of settings for each user include a setting as to whether the user is allowed to log in, a setting of a service available for use by the user, and the like. Here, as a method of setting the authentication method when logging in to each device (inputting an ID/password, using an integrated circuit (IC) card, etc.), there is disclosed a method of collectively setting the authentication method to a plurality of devices (image forming apparatuses) from a server (see, for example, Patent Document 1).

Patent Document 1: Japanese Patent No. 5069820

SUMMARY OF THE INVENTION

According to one aspect of the present invention, there is provided an image forming apparatus including circuitry; and a memory storing computer-executable instructions that cause the circuitry to execute determining an authentication method that is available for use for login, based on both a setting of the authentication method for login that is acquired via a network and the setting of the authentication method for login that is set in the image forming apparatus; and displaying, on the image forming apparatus, a login screen corresponding to the authentication method that is available for use.

DESCRIPTION OF THE EMBODIMENTS

Other than the case of setting the authentication method for each device from the server side, there is also a case of setting the authentication method from the device side. When displaying a login screen, it is necessary to display an appropriate login screen based on settings of both sides.

However, in the conventional technology, when the setting of the authentication method on the device side is changed, there has been a problem that an appropriate login screen cannot be displayed.

A problem to be addressed by an embodiment of the present invention is to display an appropriate login screen in accordance with a change in the setting of the authentication method on the device side.

Hereinafter, an example of a configuration diagram of a service providing system according to an embodiment of the present invention will be described with reference to the accompanying drawings.

First Embodiment

<System Configuration>

Figure 1:
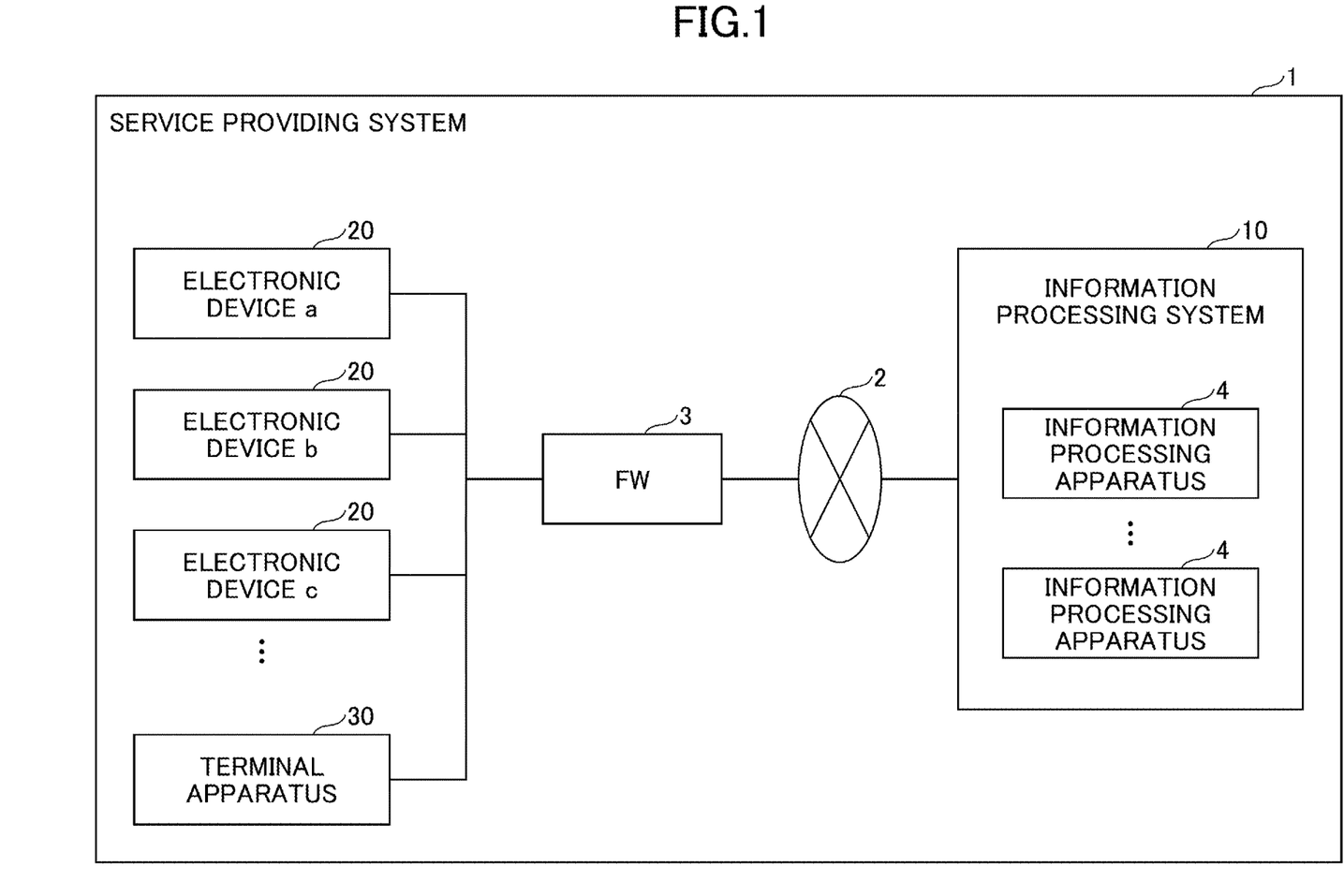
FIG. 1 is an example of a system configuration diagram of a service providing system according to a first embodiment of the present invention.

In a service providing system 1 of FIG. 1, an electronic device 20 and a terminal apparatus 30 are connected to an information processing system 10 via a network 2 such as the Internet and a firewall (FW) 3. A user may use a plurality of the electronic devices 20a, 20b, and 20c connected to the network to use a variety of services such as printing, scanning, uploading of documents, and the like. User accounts are centrally managed on the cloud side (the network side), and the electronic devices 20 and services that are available for use are managed in units of organizations referred to as tenants. When the user or the manager logs in from the electronic device 20 or the terminal apparatus 30 for the purpose of using a service or for business management, authentication of the user is required. User authentication can be performed by inputting an ID and a password, or by using a pre-registered IC card or the like.

The information processing system 10 may be implemented by one information processing apparatus 4 or may be implemented by being distributed among a plurality of the information processing apparatuses 4. For example, there may be an information processing apparatus 4 with respect to each service for providing the corresponding service, a single information processing apparatus 4 may provide a plurality of services, or one service may be provided by a plurality of the information processing apparatuses 4.

The information processing system 10 may be compatible with cloud computing. Cloud computing is a form of use in which resources on a network are used without considering particular hardware resources. The information processing system 10 that is compatible with cloud computing may be referred to as a cloud system. The information processing system 10 may be on the Internet or may be on-premise.

The electronic device 20 is, for example, an image forming apparatus, and an image forming apparatus includes a laser printer, a Multi-function Peripheral/Product/Printer (MFP), or the like. The electronic device 20 may also be an electronic blackboard. The electronic device 20 may also be, for example, a projector, an output device such as a digital signage, a Head Up Display (HUD) device, an industrial machine, an imaging device, a sound collector, a medical device, a network home appliance, an automobile (connected car), a notebook personal computer (PC), a mobile phone, a smartphone, a tablet terminal, a game machine, a Personal Digital Assistant (PDA), a digital camera, a wearable PC, a desktop PC, or the like.

The information processing system 10 includes one or more information processing apparatuses 4 connected to the network 2. The information processing system 10 creates screen information of a web page to be displayed on the terminal apparatus 30 or the electronic device 20 and transmits the screen information. The screen information may be created by Hyper Text Markup Language (HTML), eXtensible Markup Language (XML), Cascade Style Sheet (CSS), JavaScript (trademark), and the like. A web page may be provided by a web application. A web application refers to software or a mechanism for running on a web browser by coordinating a program in a programming language (e.g., JavaScript(registered trademark)) running on a web browser with a program running on a web server. A web application can also change a web page dynamically.

The terminal apparatus 30 is an information processing apparatus such as a smartphone, a mobile phone, a tablet PC, a desktop PC, a notebook PC, or the like used by the tenant manager and the user. In the terminal apparatus 30, a program having a screen display function such as a web browser is installed. The program will suffice as long as the program has a function of displaying screen information received from the information processing system 10 as a screen, and the program is not limited to being relevant to a web browser, and may be a program exclusively used for the information processing system 10.

<Hardware Configuration>

Figure 2:
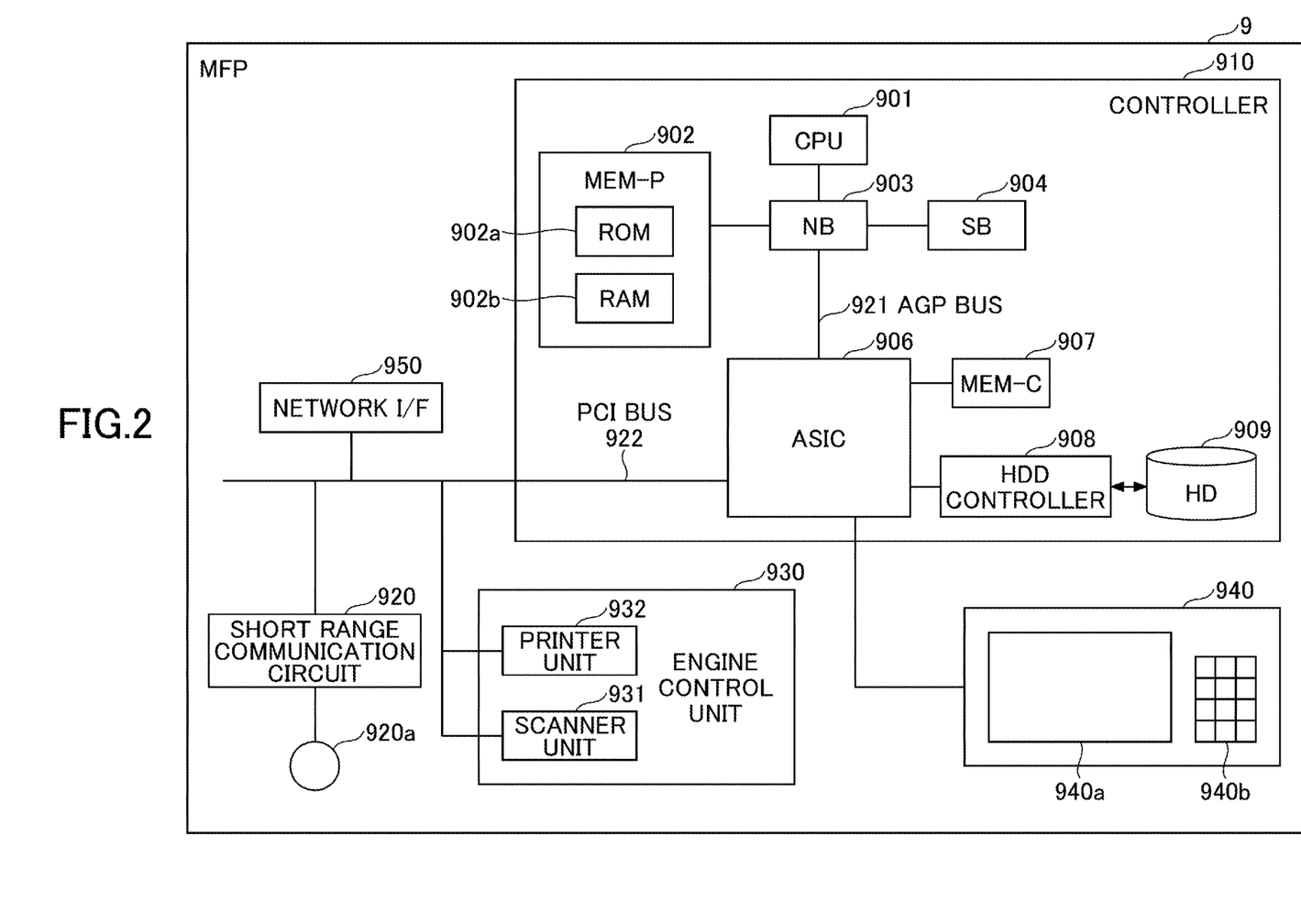
FIG. 2 illustrates an example of a hardware configuration of an electronic device (image forming apparatus) according to the first embodiment of the present invention.

FIG. 2 is a hardware configuration diagram of an image forming apparatus (a MFP 9) that is an example of the electronic device 20. As illustrated in FIG. 2, the MFP 9 includes a controller 910, a short range communication circuit 920, an antenna 920*a* of the short range communication circuit 920, an engine control unit 930, an operation panel 940, and a network interface (I/F) 950. The operation panel 940 includes a panel display unit 940*a* for receiving input from a user and a numeric pad 940*b* for receiving input from a user. Among these, the controller 910 includes a central processing unit (CPU) 901 that is the main portion of a computer, a system memory (MEM-P) 902, a north bridge (NB) 903, a south bridge (SB) 904, an Application Specific Integrated Circuit (ASIC) 906, a local memory (MEM-C) 907, a hard disk drive (HDD) controller 908, and a HD 909 that is a storage unit, and the NB 903 and the ASIC 906 are connected by an Accelerated Graphics Port (AGP) bus 921.

Among these, the CPU 901 is a control unit that performs the overall control of the MFP 9. The NB 903 is a bridge for connecting the CPU 901 to the MEM-P 902, the SB 904, and the AGP bus 921, and includes a memory controller for controlling the reading and writing from and to the MEM-P 902, a Peripheral Component Interconnect (PCI) master, and an AGP target.

The MEM-P 902 includes a read-only memory (ROM) 902*a*, which is a memory for storing programs and data for implementing each function of the controller 910, and a random access memory (RAM) 902*b*, which is used for loading programs and data and is used as a rendering memory at the time of memory printing, and the like. The program stored in RAM 902*b* may be configured to be provided by being recorded in a computer-readable recording medium such as a compact disk read-only memory (CD-ROM), a CD recordable (CD-R), a digital versatile disc (DVD), or the like, in a file in an installable format or an executable format.

The SB 904 is a bridge for connecting the NB 903 to PCI devices and peripheral devices. The ASIC 906 is an integrated circuit (IC) for image processing applications including hardware elements for image processing, and serves as a bridge connecting the AGP bus 921, a PCI bus 922, the HDD controller 908, and the MEM-C 907. The ASIC 906 includes a PCI target and AGP master, an arbiter (ARB) that forms the core of the ASIC 906, a memory controller that controls the MEM-C 907, a plurality of Direct Memory Access Controllers (DMACs) that rotate image data and the like by hardware logic, and a PCI unit that performs data transfer between a scanner unit 931 and a printer unit 932 via the PCI bus 922. The interface of the Universal Serial Bus (USB) or the interface of the IEEE 1394 (Institute of Electronic and Electronic Engineers 1394) may be connected to the ASIC 906.

Figure 3:
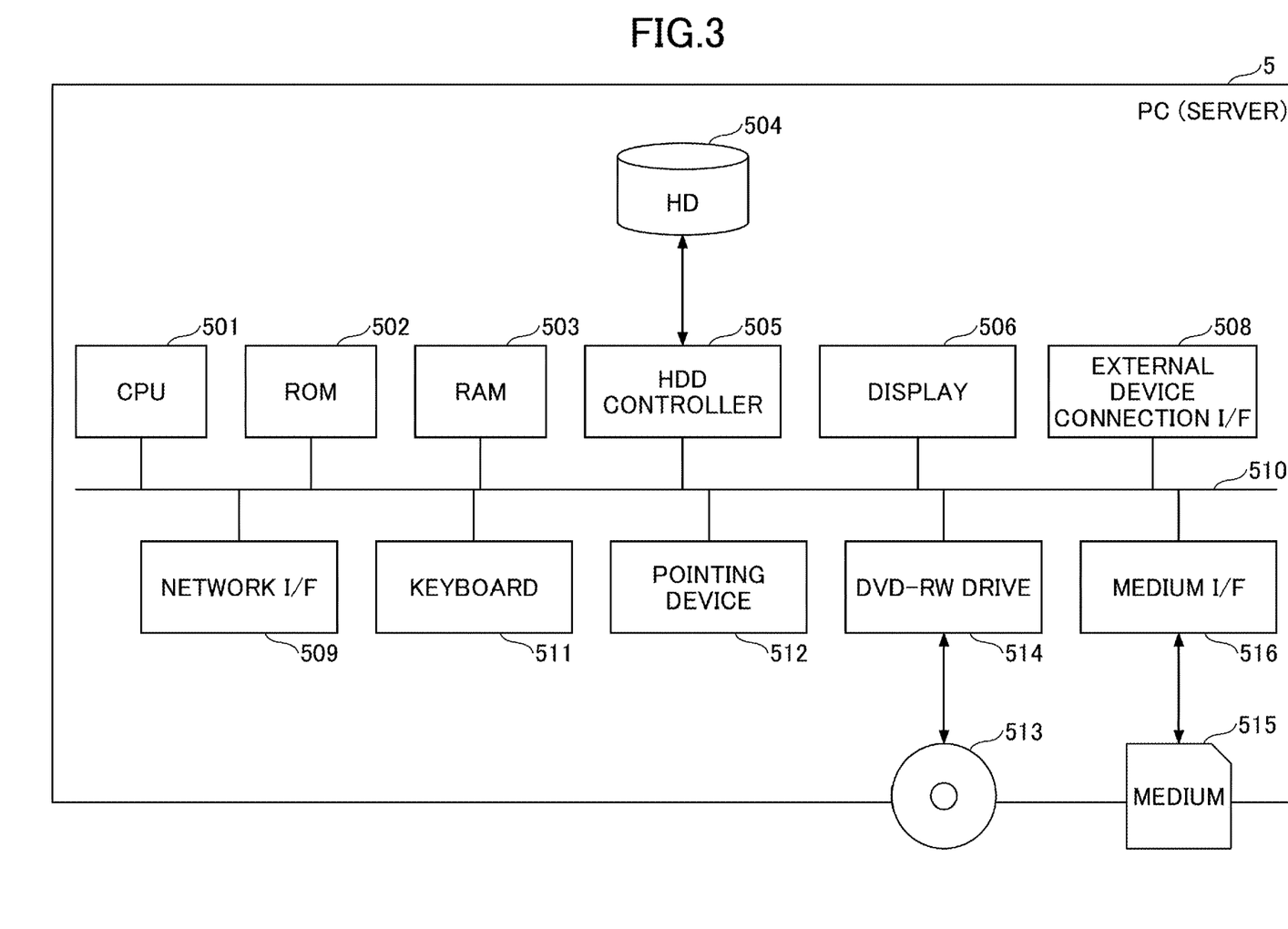
FIG. 3 illustrates an example of a hardware configuration of an information processing system and a terminal apparatus according to the first embodiment of the present invention.

FIG. 3 is a hardware configuration diagram of a PC (server) 5 that is an example of the information processing system 10 and the terminal apparatus 30. As illustrated in FIG. 3, the PC (server) 5 is configured by a computer and includes a CPU 501, a ROM 502, a RAM 503, a HD 504, a HDD controller 505, a display 506, an external device connection I/F (interface) 508, a network I/F 509, a bus line 510, a keyboard 511, a pointing device 512, a digital versatile disk reusable (DVD-RW) drive 514, and a medium I/F 516.

Among these, the CPU 501 controls the operation of the entire service providing system 1 and the terminal apparatus 30. The ROM 502 stores a program used to drive the CPU 501, such as an initial program loader (IPL). The RAM 503 is used as the work area of the CPU 501. The HD 504 stores various kinds of data such as a program. The HDD controller 505 controls the reading or writing of various kinds of data from and to the HD 504 according to the control of the CPU 501. The display 506 displays various kinds of information such as cursors, menus, windows, characters, images, or the like. The external device connection I/F 508 is an interface for connecting various external devices. In this case, the external device may be, for example, a USB memory or a printer. The network I/F 509 is an interface for performing data communication by using the network 2. The bus line 510 is an address bus, a data bus, or the like for electrically connecting elements such as the CPU 501 illustrated in FIG. 3.

The keyboard 511 is a type of input means including a plurality of keys used for inputs such as characters, numbers, various instructions, or the like. The pointing device 512 is a type of input means for selecting and executing various instructions, selecting a processing target, moving a cursor, and the like. The DVD-RW drive 514 controls the reading or writing of various kinds of data from or to the DVD-RW 513 as an example of a removable recording medium. The DVD-RW drive 514 is not limited to corresponding to a DVD-RW but may be corresponding to a Digital Versatile Disc Recordable (DVD-R) or the like. The medium I/F 516 controls the reading or writing (storage) of data from or to a recording medium 515, such as a flash memory.

<Functions>

Figure 4:
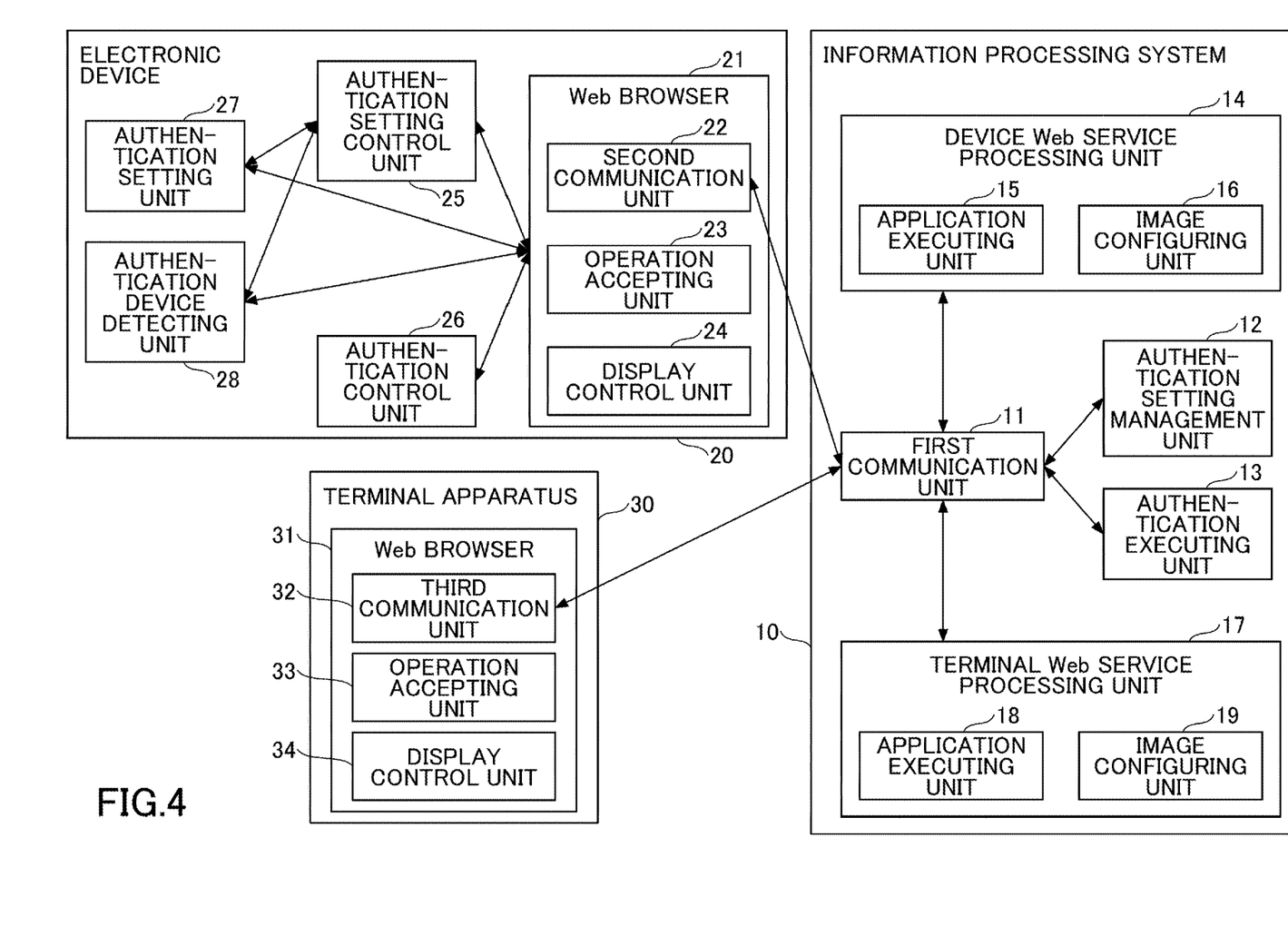
FIG. 4 is example of a functional block diagram of a service providing system according to the first embodiment of the present invention.

Next, the functional configuration of the service providing system 1 according to the present embodiment will be described with reference to FIG. 4. FIG. 4 is a diagram illustrating an example of the functional configuration of the service providing system 1 according to the present embodiment.

The information processing system 10 includes a first communication unit 11, an authentication setting management unit 12, an authentication executing unit 13, a device web service processing unit 14, and a terminal web service processing unit 17. Each of the functional units is a function or means implemented by the CPU 501 executing instructions included in one or more programs installed in the information processing system 10.

The first communication unit 11 transmits and receives various kinds of information with the electronic device 20 and the terminal apparatus 30. The authentication setting management unit 12 manages the setting relating to the user authentication method on the cloud side. The authentication setting management unit 12 reports or changes the setting according to a request from an authorized user.

The authentication executing unit 13 receives a login request to the information processing system 10, executes user authentication based on the received authentication information, and reports the result.

The device web service processing unit 14 includes an application executing unit 15 and an image configuring unit 16. The application executing unit 15 requests the electronic device 20 to execute an application. For example, in the case of an image forming apparatus, execution of printing or scanning is required. Further, the application executing unit 15 requests the authentication setting management unit 12 to execute an application which performs login or authentication setting. The image configuring unit 16 displays parameters necessary for setting an application and displays a screen for receiving input.

The terminal web service processing unit 17 includes an application executing unit 18 and an image configuring unit 19. The application executing unit 18 requests the authentication setting management unit 12 to execute an application that performs the login and authentication setting. The image configuring unit 19 displays the parameters necessary for setting an application and displays a screen for receiving input.

The electronic device 20 includes a web browser 21, an authentication setting control unit 25, an authentication control unit 26, an authentication setting unit 27, and an authentication device detecting unit 28.

The web browser 21 includes a second communication unit 22, an operation accepting unit 23, and a display control unit 24. The web browser 21 downloads a program from the device web service processing unit 14. Each functional unit is a function or means implemented by the CPU 901 executing instructions included in one or more downloaded programs.

The second communication unit 22 transmits and receives various kinds of information with the information processing system 10. The operation accepting unit 23 receives various operations by a user on various screens displayed on the panel display unit 940a. Screen information is a program described in HTML, XML, script language, CSS (Cascading Style Sheet), and the like. The configuration of a web page is mainly identified by HTML, the operation of a web page is defined by a script language, and the style of a web page is identified by CSS. The display control unit 24 interprets the screen information of various screens and displays the screen information on the panel display unit 940a.

The authentication setting control unit 25 acquires a setting relating to the authentication method set in the authentication setting management unit 12 and acquires or updates the setting relating to the authentication method set in the authentication setting unit 27. The authentication control unit 26 acquires the settings relating to the authentication method set in the authentication setting management unit 12 and the authentication setting unit 27 and determines the authentication method that is available for use and that is to be displayed on the login screen.

The authentication setting unit 27 transmits the setting relating to a stored authentication method according to a request or stores a received setting.

The authentication device detecting unit 28 detects an authentication device such as an IC card or a smartphone by an NFC (Near Field Communication) or a receiving device for Bluetooth connected to the short range communication circuit 920, and transmits information such as the acquired identification ID to the authentication control unit 26.

The terminal apparatus 30 includes a web browser 31. The web browser 31 includes a third communication unit 32, an operation accepting unit 33, and a display control unit 34, and downloads a program from the terminal web service processing unit 17. Each functional unit is a function or means implemented by the CPU 501 executing instructions included in one or more downloaded programs.

The third communication unit 32 transmits and receives various kinds of information from and to the information processing system 10. The operation accepting unit 33 receives various operations of a user on various screens displayed on the display 506. Screen information is a program described in HTML, XML, script language, and CSS. The configuration of a web page is mainly identified by HTML, the operation of a web page is defined by a script language, and the style of a web page is identified by CSS. The display control unit 34 interprets the screen information of various screens and displays the screen on the display 506.

<Process Flow>

Figure 5:
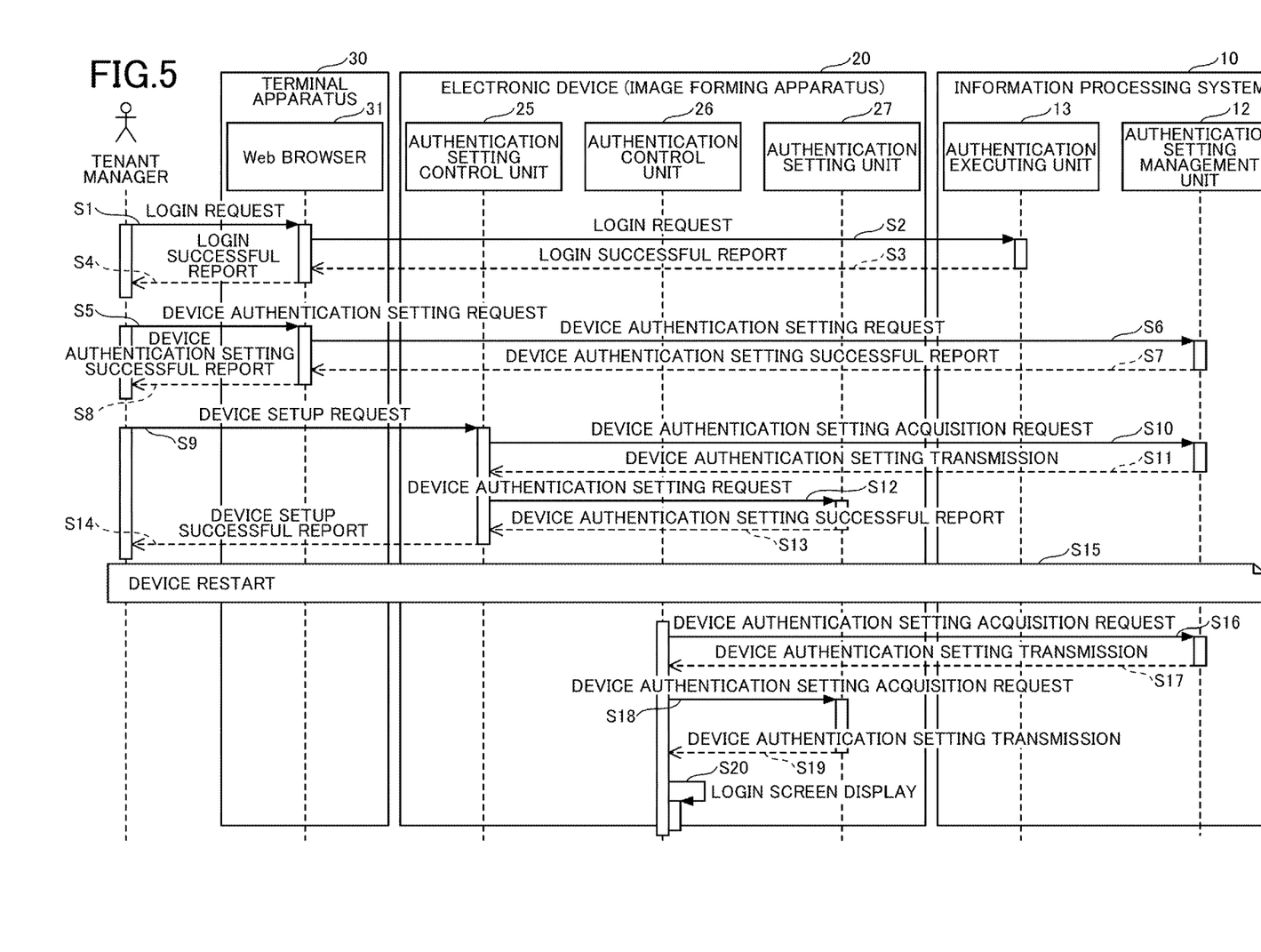
FIG. 5 is an example of a sequence diagram illustrating a process according to the first embodiment of the present invention.

FIG. 5 is an example of a process of displaying a login screen on the electronic device 20 based on the setting of the authentication method available for use. Here, with regard to the authentication method using two types of authentication devices, i.e., an IC card and a smart device, a setting is made on the cloud side (setting common to all of the electronic devices 20 belonging to a tenant; hereinafter also referred to as a "common setting"), and then a setting specific to each electronic device 20 (hereinafter also referred to as a "device setting") is made. Finally, on the electronic device 20 that is appropriate with respect to both settings, a login screen is displayed.

S1: A user having the authority to change the setting, such as a tenant manager or the like, logs in from a login screen for making a device authentication setting, displayed by the display control unit 34 of the web browser 31 of the terminal apparatus 30. By inputting a login ID and a password into the operation accepting unit 33, a login request is transmitted to the authentication executing unit 13 of the information processing system 10.

S2: The authentication executing unit 13 performs user authentication by using the login ID and the password included in the received login request. Only an example in which the user authentication is successful is described here.

S3: The authentication executing unit 13 transmits a login successful report and information for accessing the site for performing the device authentication setting, to the terminal apparatus 30. The authentication executing unit 13 requests the application executing unit 15 to execute the application for making a device authentication setting. The application executing unit 15 requests the image configuring unit 16 to create a display screen for making a device authentication setting. The image configuring unit 16 transmits the screen information created based on the request to the web browser 31 of the terminal apparatus 30.

Figure 6:
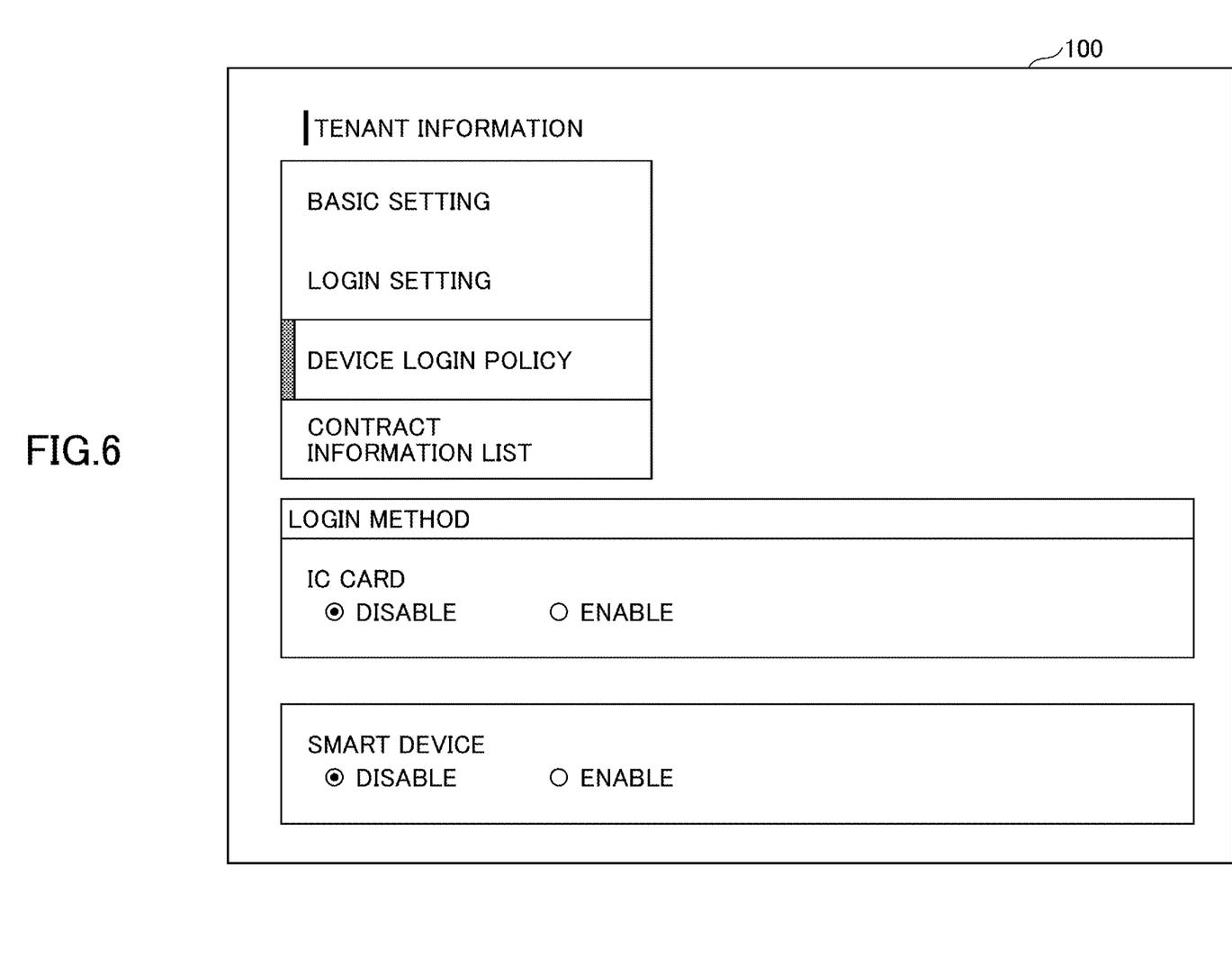
FIG. 6 illustrates an example of a device authentication setting screen according to the first embodiment of the present invention.
Figure 7:
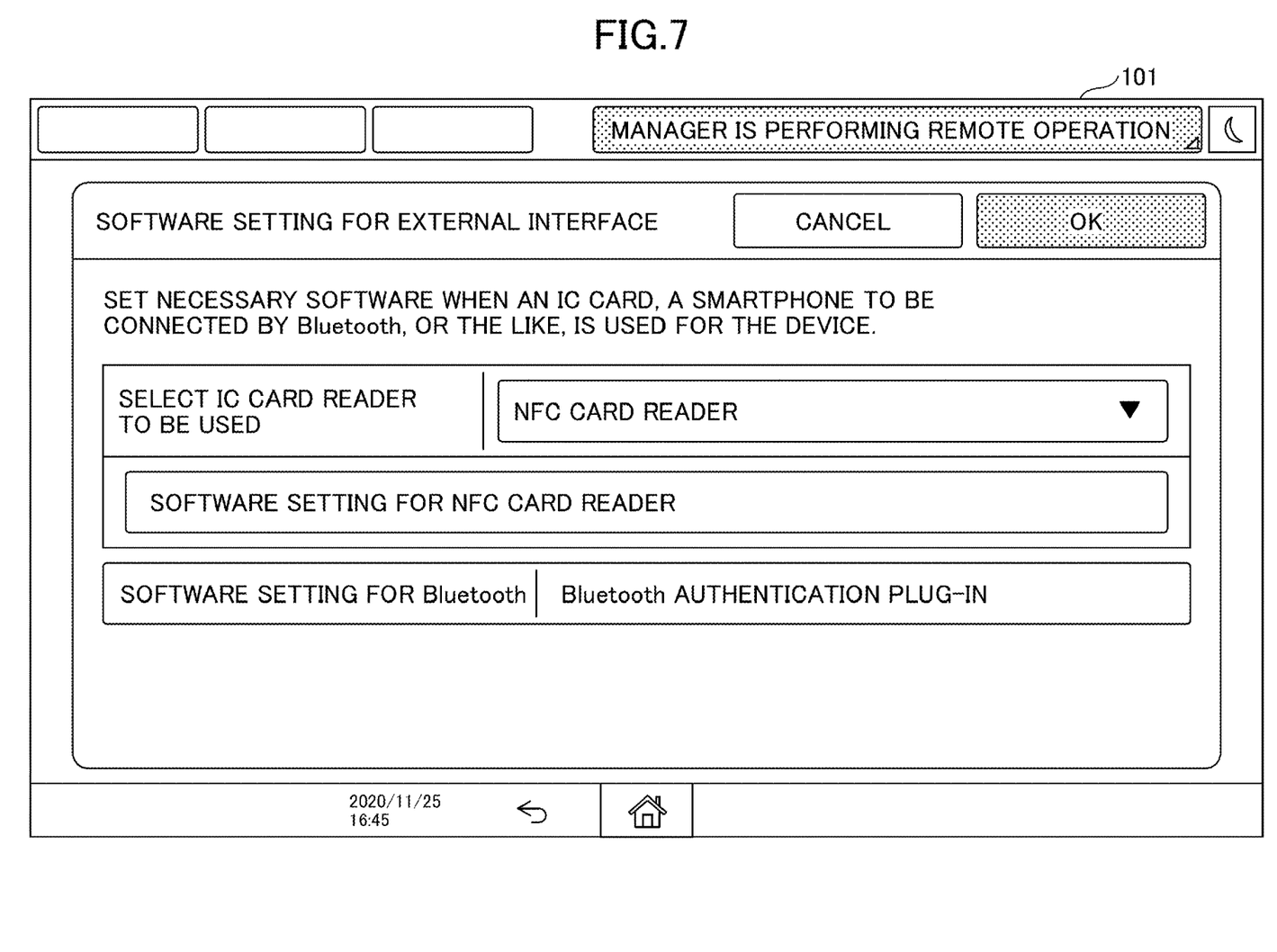
FIG. 7 illustrates an example of a device authentication detail setting screen according to the first embodiment of the present invention.

S4: The display control unit 34 of the web browser 31 displays a device authentication setting screen 100 illustrated in FIG. 6 by using the received screen information. As illustrated in FIG. 6, two types of login methods, that is, a method using an IC card and a method using a smart device, are displayed. Each type of method can be set to be enabled or disabled. Further, as illustrated in FIG. 7, detailed settings relating to NFC and Bluetooth can be made. Here, the setting may be made 1C automatically depending on the region of use, such as setting to NFC in the case of Japan and setting to USB in the case of overseas, or these settings may be made manually.

S5: The tenant manager makes a setting to enable both the IC card and the smart device.

S6: The setting input to the operation accepting unit 33 is transmitted to the authentication setting management unit 12 as a device authentication setting request.

S7: The authentication setting management unit 12 makes a setting to enable both the IC card and the smart device as the authentication method and transmits a setting successful report to the web browser 31.

S8: The web browser 31 transmits the setting successful report to the display control unit 34, and the display control unit 34 displays the updated setting value.

S9: The tenant manager operates the operation accepting unit 33 to transmit, to the authentication setting control unit 25, a device setup request for applying the changed setting to the setting of the electronic device 20. At this time, unless specified otherwise, the device authentication setting (common setting) of the cloud side is also set with respect to the electronic device 20; however, a setting different from the common setting may be made.

S10: The authentication setting control unit 25 transmits a device authentication setting acquisition request to the authentication setting management unit 12.

S11: The authentication setting management unit 12 transmits a device authentication setting (common setting) of the cloud side to the authentication setting control unit 25.

S12: The authentication setting control unit 25 transmits the device authentication setting request to the authentication setting unit 27 based on the received request and setting. If there is no request for a device setting, the common setting is requested to be set (both the IC card and the smart device are enabled). However, if the electronic device 20 is not compatible with an IC card or a smart device, these are set to be disabled.

S13: The authentication setting unit 27 transmits the device authentication setting successful report to the authentication setting control unit 25.

S14: The authentication setting control unit 25 transmits the device setup successful report to the terminal apparatus 30.

S15: The electronic device 20 is restarted to apply the changed setting.

S16: In the electronic device 20, in order to display the login screen after restart, the authentication control unit 26 transmits the device authentication setting acquisition request to the authentication setting management unit 12.

S17: The authentication setting management unit 12 transmits the device authentication setting (common setting) to the authentication control unit 26.

S18: The authentication control unit 26 transmits the device authentication setting acquisition request to the authentication setting unit 27.

S19: The authentication setting unit 27 transmits the device authentication setting (device setting) to the authentication control unit 26.

Figure 8:
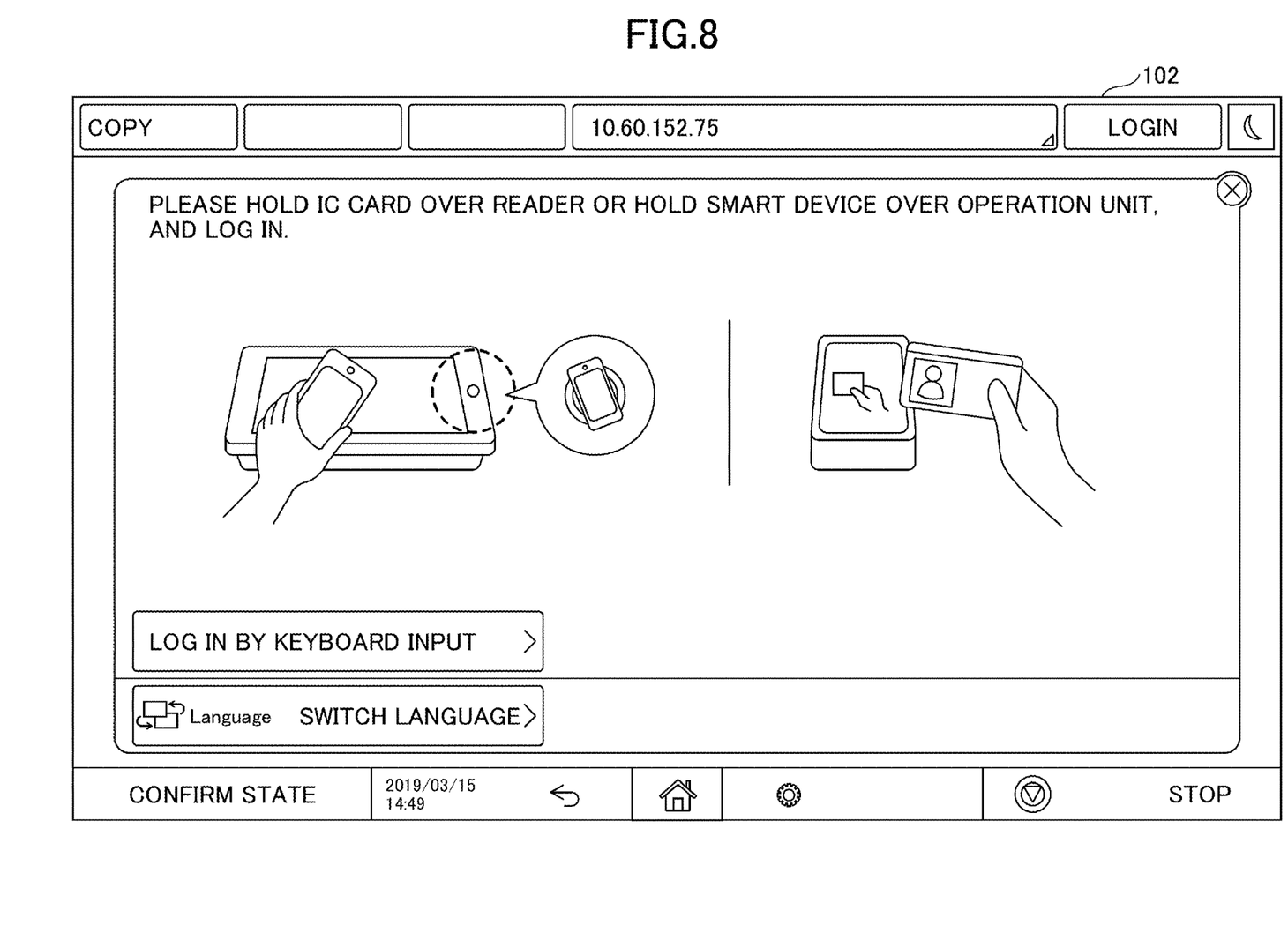
FIG. 8 illustrates an example of a login screen when both an IC card and a smart device are enabled according to the first embodiment of the present invention.
Figure 9:
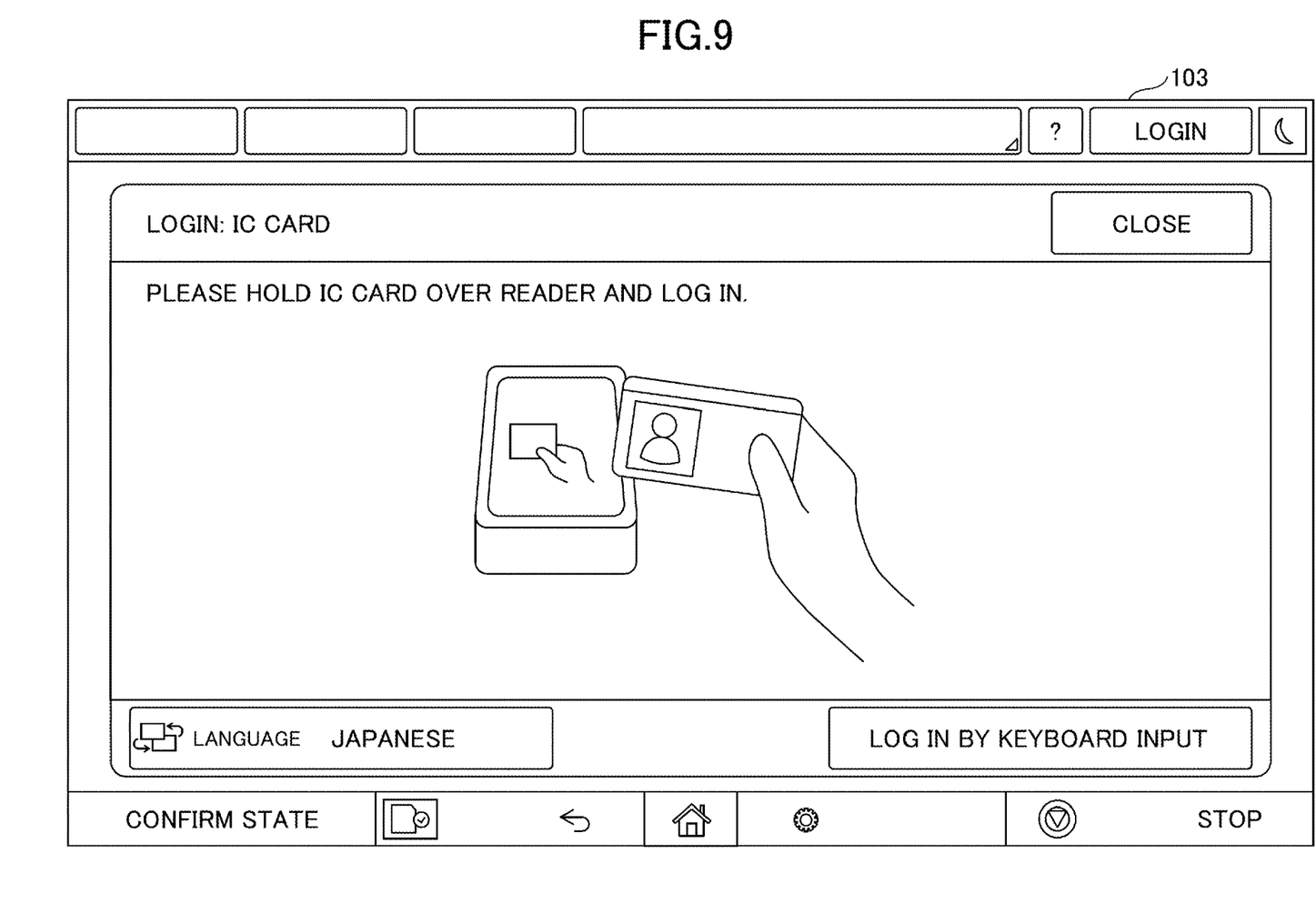
FIG. 9 illustrates an example of a login screen when only the IC card is enabled according to the first embodiment of the present invention.

S20: The authentication control unit 26 determines whether to enable each device authentication (authentication method) based on the received common setting and the device setting, and displays the appropriate login screen for the electronic device 20. Here, the appropriate login screen means a screen in which the authentication method intended by the tenant manager is displayed, and even if the same setting is used, the determination result may be different depending on the management policy. As an example of the determination method, for certain device authentication (authentication method), when both the common setting and the device setting are enabled, this method is enabled and displayed on the login screen. This method is not enabled when one of the settings is disabled. As another determination method, the method may be enabled when either the common setting or the device setting is enabled. FIG. 8 is an example of a login screen when both the IC card and the smart device are enabled. FIG. 9 is an example of the login screen when only the IC card is enabled.

As described above, according to the embodiment of the present invention, when the setting of the authentication method includes the setting of the cloud side (common to all electronic devices in the tenant) and the setting specific to each device, even if the setting of each device is changed, an appropriate login screen can be displayed.

Second Embodiment

In the second embodiment, the availability of use of an authentication method is set for each user in the setting on the cloud side. Similar to the first embodiment, there are two types of authentication devices, an IC card and a smart device, both of which are available for use at the time of login. However, if a setting relating to the user's authentication device is not enabled, login by the authentication device will be unsuccessful at first, but by updating the user's setting, login by the authentication device will become possible. The process of the second embodiment will be described by using the sequence diagram illustrated in FIG. 10.

Figure 10:
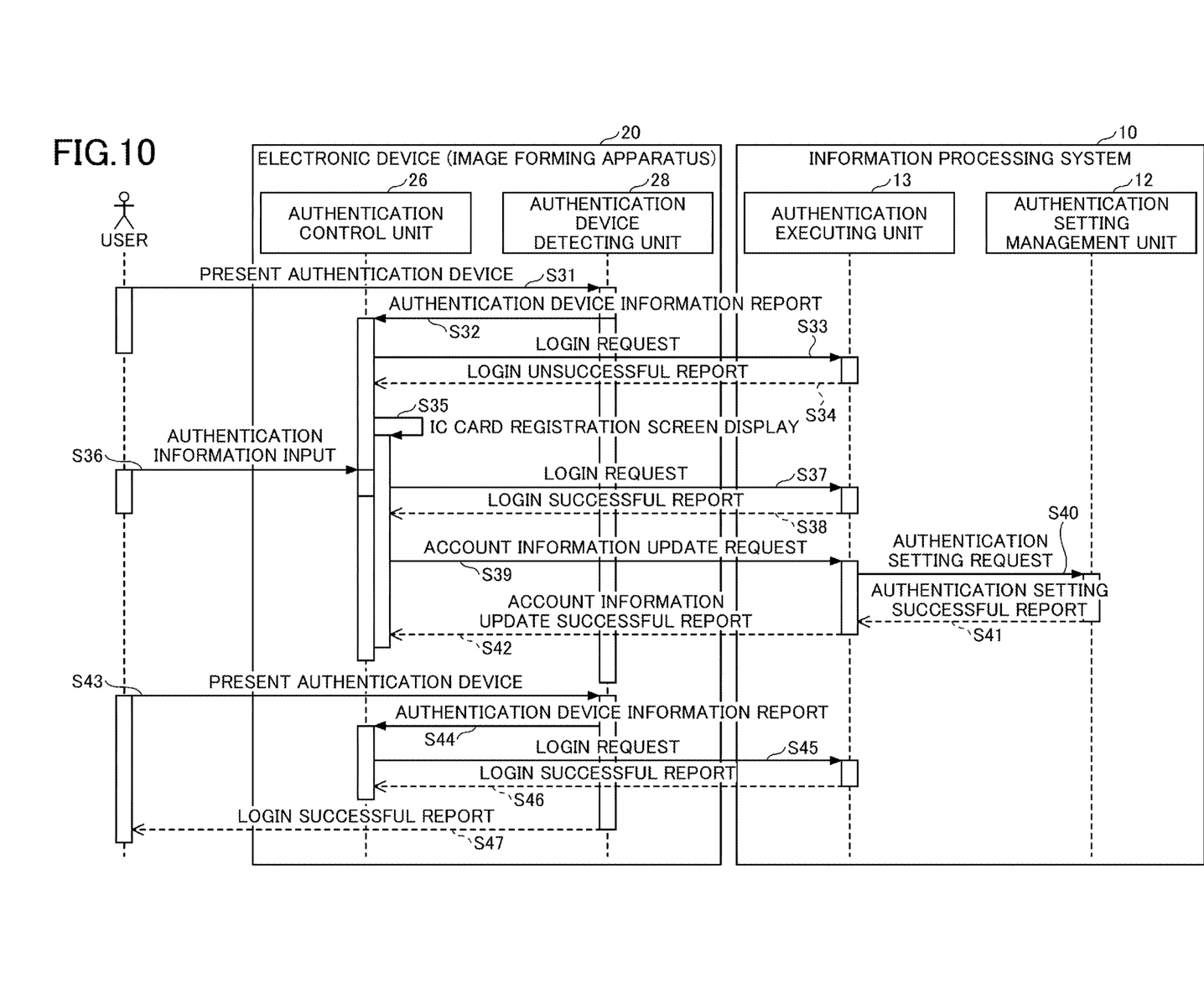
FIG. 10 is an example of a sequence diagram illustrating a process according to a second embodiment of the present invention.

S31: When a user holds an authentication device (an IC card or a smart device) over the electronic device 20, the authentication device detecting unit 28 detects the authentication device.

S32: The authentication device detecting unit 28 transmits information of the detected authentication device to the authentication control unit 26. The authentication device information includes an ID number associated with the IC card in the case of an IC card, and a UUID (Universal Unified ID) in the case of a smart device.

S33: The authentication control unit 26 transmits the login request including the information of the authentication device to the authentication executing unit 13.

S34: The authentication executing unit 13 executes authentication, but the received authentication information is not registered, so the authentication is unsuccessful. The authentication executing unit 13 transmits a login unsuccessful 2C report to the authentication control unit 26.

Figure 11:
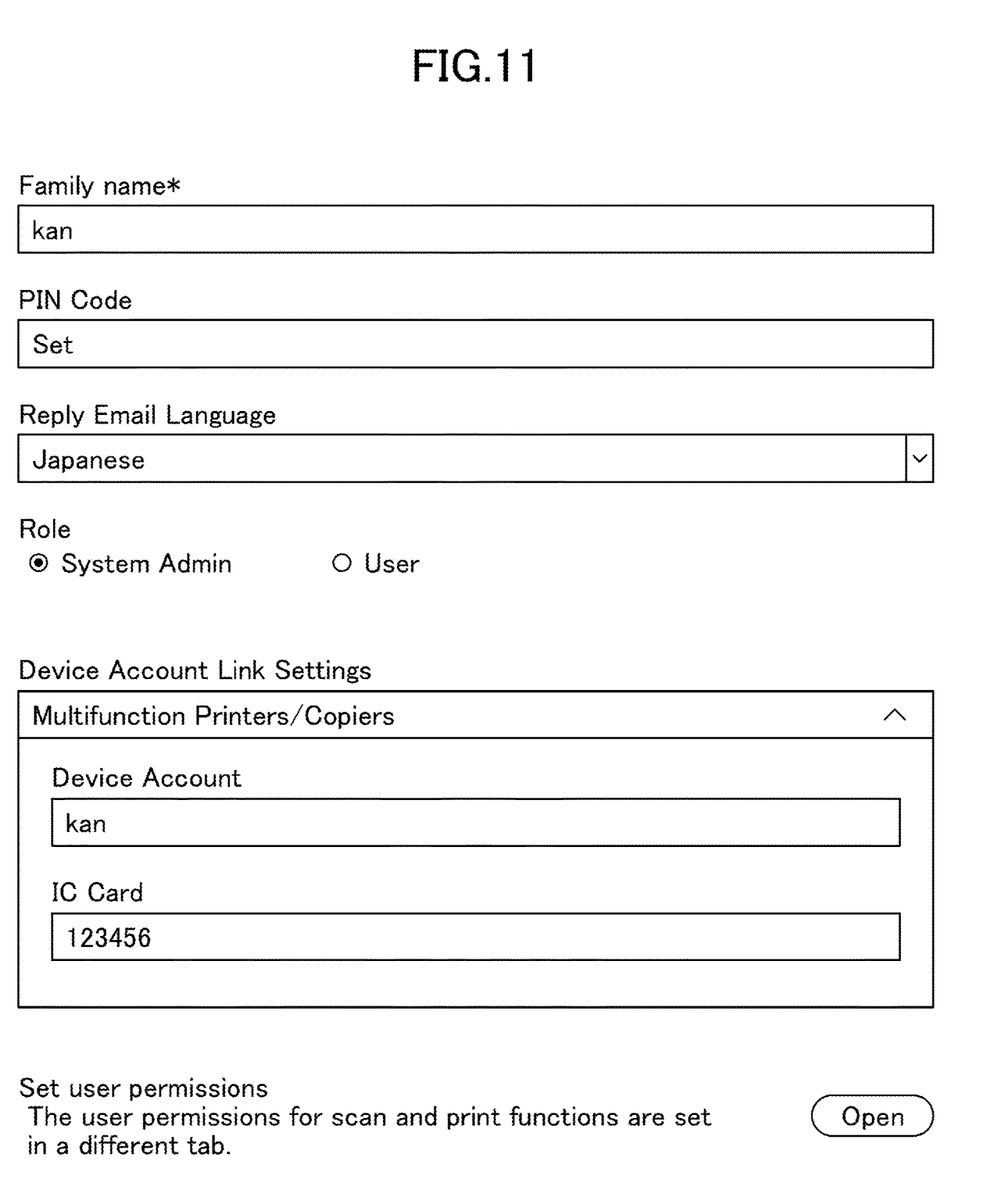
FIG. 11 illustrates an example of an authentication device registration screen according to the second embodiment of the present invention.

S35: The authentication control unit 26 displays the authentication device registration screen as illustrated in FIG. 11 on the display control unit 24.

S36: The user inputs the user ID, password, and information information necessary for the authentication device registration from the operation accepting unit 23.

S37: The authentication control unit 26 transmits the user's login request together with the authentication information (user ID and password) to the authentication executing unit 13.

S38: The authentication executing unit 13 executes authentication by using the received authentication information (user ID and password) and transmits a login successful report to the authentication control unit 26.

S39: The authentication control unit 26 transmits an account information update request including the information (ID, UUID, or the like) of the authentication device, to the authentication executing unit 13.

S40: The authentication executing unit 13 transmits the received account information update request to the authentication setting management unit 12.

S41: The authentication setting management unit 12 registers the information of the user's authentication device and transmits an account information update successful report to the authentication executing unit 13.

Figure 12:
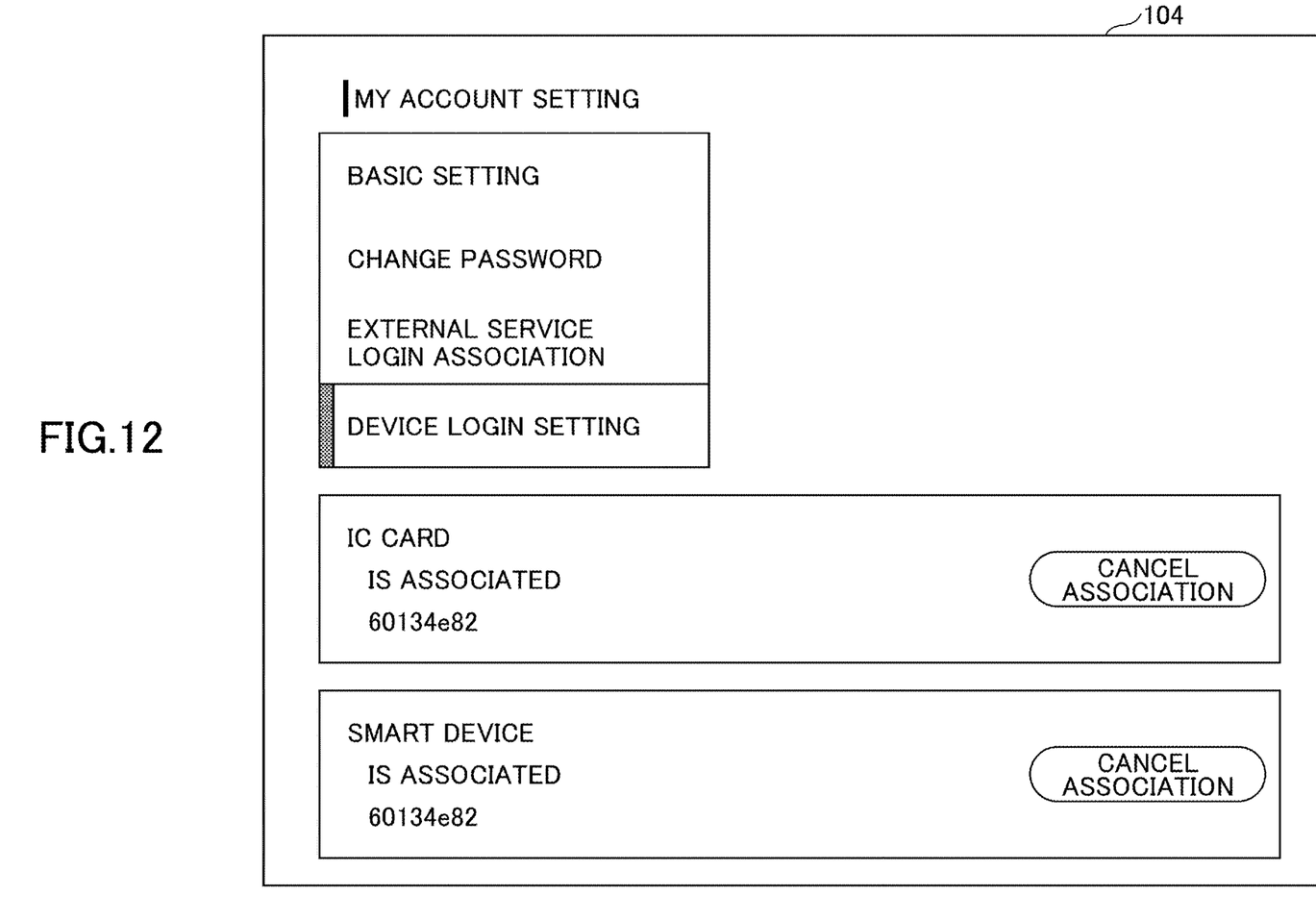
FIG. 12 illustrates an example of the association between a user account and an authentication device according to the second embodiment of the present invention.

S42: The authentication executing unit 13 transmits the received account information update successful report to the authentication control unit 26. This enables the user to log in by the registered authentication device (IC card, smart device, etc.). In the setting screen illustrated in FIG. 12, the user can confirm that his/her user account is associated with an authentication device (IC card or smart device) and cancel the association. By cancelling the association, the cancelled authentication device cannot be used to log in.

S43: When a user holds an authentication device (an IC card or a smart device) over the electronic device 20, the authentication device detecting unit 28 detects the authentication device.

S44: The authentication device detecting unit 28 transmits information of the detected authentication device to the authentication control 2C unit 26.

S45: The authentication control unit 26 transmits the login request including the information of the authentication device to the authentication executing unit 13.

S46: The authentication executing unit 13 executes authentication, and because the received authentication information is registered, the authentication is successful. The authentication executing unit 13 transmits a login successful report to the authentication control unit 26.

As described above, according to the embodiment of the present invention, with respect to the setting of an authentication method, a user having a user account at the cloud side can perform an operation of registering and canceling an authentication device by the user himself/herself. Alternatively, the manager may set whether an authentication device is available for use for each user.

The image forming apparatus, the information processing method, and the recording medium are not limited to the specific embodiments described in the detailed description, and variations and modifications may be made without departing from the spirit and scope of the present invention.

Furthermore, the configuration example of the functional block diagram of FIG. 4 is divided according to the main functions to facilitate the understanding of processes by the information processing system 10, the electronic device 20, and the terminal apparatus 30. The present invention is not limited by how the process units are divided or the names of the process units. The processes of the information processing system 10, the electronic device 20, and the terminal apparatus 30 may be further divided into many process units according to the process contents. Furthermore, the process units may be divided such that a single process unit further includes many processes.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC), a digital signal processor (DSP), a field programmable gate array (FPGA), and a conventional circuit module, designed to execute each function as described above.

Also, the apparatus group described in the examples are merely indicative of one of a plurality of computing environments for carrying out the embodiments disclosed herein. In some embodiments, the service providing system includes a plurality of computing devices, such as server clusters. The plurality of computing devices are configured to communicate with each other via any type of communication link, including networks, a shared memory, and the like, and perform the processes disclosed herein.

Further, the electronic device 20 is not limited to an image forming apparatus, as long as a communication function is included. The electronic device 20 may be, for example, a Projector (PJ), an Interactive White Board (IWB, a whiteboard having a blackboard function capable of mutual communication), an output device such as a digital signage, a Head Up Display (HUD) device, an industrial machine, an imaging device, a sound collector, a medical device, a network appliance, a connected car, a notebook PC, a mobile phone, a smartphone, a tablet terminal, a game machine, a Personal Digital Assistant (PDA), a digital camera, a wearable PC, a desktop PC, and the like.

According to one embodiment of the present invention, an appropriate login screen can be displayed in accordance with a change in the setting of the authentication method on the device side.

What is claimed is:

1. An electronic apparatus comprising:
   circuitry; and
   a memory storing computer-executable instructions that cause the circuitry to execute:
   acquiring first setting information on an authentication method via a network;
   acquiring second setting information on the authentication method set in the electronic apparatus;

determining an available authentication method for use for login, based on both of the first setting information and the second setting information, the available authentication method being a method enabled in both of the first setting information and the second setting information;

enabling the available authentication method;

displaying, on the electronic apparatus, a login screen corresponding to the available authentication method; and detecting authentication information from an authentication device corresponding to the available authentication method.

2. The electronic apparatus according to claim 1, wherein the first setting information acquired via the network includes an authentication device setting indicating whether login by using the authentication device is possible for each user, and wherein the circuitry is further caused to execute:

making an update request to update the authentication device setting in response to a request; and updating the authentication device setting in response to receiving the update request.

3. The electronic apparatus according to claim 1, wherein the determining includes determining an authentication method which is enabled in the first setting information or the second setting information, as the available authentication method.

4. The electronic apparatus according to claim 1, wherein the first setting information is common setting information which is common to a plurality of electronic devices belonging to a tenant where the electronic apparatus belong, and wherein the second setting information is device setting information which is specific to the electronic apparatus.

5. The electronic apparatus according to claim 1, wherein each of the first setting information and the second setting information includes information indicating that a first authentication method is enabled or disabled and information indicating that a second authentication method is enabled or disabled.

6. The electronic apparatus according to claim 1, wherein the circuitry is further caused to execute restarting the electronic apparatus after the acquiring of the first setting information, and performing the acquiring of the second setting information after the restarting.

7. An information processing method comprising:

acquiring first setting information on an authentication method via a network;

acquiring second setting information on the authentication method set in an electronic apparatus;

determining an available authentication method for use for login, based on both of the first setting information and the second setting information, the available authentication method being a method enabled in both of the first setting information and the second setting information;

enabling the available authentication method;

displaying, on the electronic apparatus, a login screen corresponding to the available authentication method; and detecting authentication information from an authentication device corresponding to the available authentication method.

8. A non-transitory computer-readable recording medium storing a program that causes a computer to execute a process performed in an electronic apparatus, the process comprising:

acquiring first setting information on an authentication method via a network;

acquiring second setting information on the authentication method set in the electronic apparatus;

determining an available authentication method for use for login, based on both of the first setting information and the second setting information, the available authentication method being a method enabled in both of the first setting information and the second setting information;

enabling the available authentication method;

displaying, on the electronic apparatus, a login screen corresponding to the available authentication method; and detecting authentication information from an authentication device corresponding to the available authentication method.

\* \* \* \* \*